US008699758B2

(12) United States Patent
Almbladh

(10) Patent No.: US 8,699,758 B2
(45) Date of Patent: Apr. 15, 2014

(54) OBJECT COUNTER AND METHOD FOR COUNTING OBJECTS

(75) Inventor: Johan Almbladh, Lund (SE)

(73) Assignee: Axis AB, Lund (SE)

( * ) Notice: Subject to any disclaimer, the term of this patent is extended or adjusted under 35 U.S.C. 154(b) by 198 days.

(21) Appl. No.: 13/296,708

(22) Filed: Nov. 15, 2011

(65) Prior Publication Data

US 2012/0128212 A1 May 24, 2012

Related U.S. Application Data

(60) Provisional application No. 61/415,134, filed on Nov. 18, 2010.

(30) Foreign Application Priority Data

Nov. 18, 2010 (EP) ..................................... 10191650

(51) Int. Cl.
*G06K 9/00* (2006.01)

(52) U.S. Cl.
USPC .......................................... 382/107; 382/103

(58) Field of Classification Search
None
See application file for complete search history.

(56) References Cited

U.S. PATENT DOCUMENTS

2013/0148848 A1* 6/2013 Lee et al. ...................... 382/103

FOREIGN PATENT DOCUMENTS

EP     0700017 A2    3/1996

OTHER PUBLICATIONS

Albiol, Antonio, Inmaculada Mora, and Valery Naranjo. "Real-time high density people counter using morphological tools." Intelligent Transportation Systems, IEEE Transactions on 2.4 (2001): 204-218.*
Lee et al., "Automatic Estimation of Pedestrian Flow," Distributed Smart Cameras. ICDSC 2007. First ACM/IEEE International Conference on, IEEE, PI, Sep. 1, 2007, pp. 291-296.
Lie et al., "Moving object detection, inspection, and counting using image stripe analysis," Pattern Recognition Letters, 8:(3)189-196, Oct. 1, 1988.
European Search Report for Application No. EP10191650, dated Apr. 19, 2011.

* cited by examiner

*Primary Examiner* — Nirav G Patel
(74) *Attorney, Agent, or Firm* — Volpe and Koenig, P.C.

(57) ABSTRACT

An object counter performs a method for counting objects that includes capturing images representing moving images of a predetermined counting view, detecting a motion region in the moving images of the predetermined counting view, calculating a motion region speed value indicating a speed of movement of the motion region. A contribution zone is repeatedly defined based on a predetermined counting boundary, the motion region speed value, and a contribution time period. A sub area value representing the size of the area of the motion region contained in the defined contribution zone is repeatedly retrieved and registered. A total area value is generated by adding a plurality of registered sub area values, and estimating the number of objects that have passed the counting boundary based on a reference object area value.

16 Claims, 9 Drawing Sheets

OBJECT COUNTER AND METHOD FOR COUNTING OBJECTS

CROSS REFERENCE TO RELATED APPLICATIONS

This application claims priority to U.S. Provisional Application No. 61/415,134 filed on Nov. 18, 2010 and European Patent Application 10191650.0 filed on Nov. 18, 2010, which are incorporated by reference as if fully set forth.

TECHNICAL FIELD OF THE INVENTION

The present invention relates to an object counter and a method for counting objects passing a predetermined boundary. More particularly it relates to counting such objects by means of analyzing images captured using a camera.

BACKGROUND OF THE INVENTION

Object counters based on a sensor and an analyzer cooperating for determining the number of objects passing a boundary is widely used in different applications.

An object counter is a device which is used to count objects, like for example people entering or leaving a department store, a train station or any other area of interest, livestock leaving or entering an area, products passing on a conveyor belt, or products passing on a conveyor slide, etc. The object counter may for example be used for security purposes but also for generating statistics of objects entering or leaving an area.

An object counter comprises in general terms a sensing part and an analyzing part. The sensing part commonly based on a sensor detecting some feature related to the objects, like for example an image sensor detecting the visible part of the light spectrum for detecting visible features of objects, a Focal Plane Array like for example a microbolometer sensor detecting in the infrared part of the light spectrum for registering the thermal profile of objects or a time-of-flight sensor system creating an image of the distance to objects in an image view.

In the case of the sensing part being a sensor registering features of the objects in an array, e.g., registering data that may be interpreted and analyzed by means of image analyzing tools, then the analyzing part generally is adapted for image analyzing. In most object counters the image analysis is based on object detection algorithms, e.g., in which individual objects are detected, identified, and tracked throughout the area covered by the sensor and then counted as they pass by a predetermined boundary. Several types of object detection algorithms are known to the person skilled in the art.

One problem with the current object detection algorithms is that objects being close together, having similar features, and/or having approximately the same speed are very difficult to detect as separate objects. Situations where these problems are evident are, for instance, when counting objects that are haphazardly outputted onto a conveyer belt as the objects may arrange themselves close together or on top of each other in clusters of varying sizes, when counting people entering or exiting shops or grocery stores, as people often enters in clusters, i.e., enters in groups of two or more walking closely together, and other similar situations. A cluster of objects should be understood as a group of objects grouped close together. The problem occurs because the cluster of objects may be detected as one single object. Many object counters rely on simply counting the detected objects which will result in an underestimation of the number of objects if the objects arrive in clusters and if each cluster is counted as one object.

In some prior art solutions the shape of the detected object is analyzed in order to estimate a more accurate count of the number of objects comprised in a detected object. However, such shape analysis of the detected objects requires a lot of processing power, hence, limiting the use of the method to devices having a lot of spare processing power. Such processing power may not be available in embedded systems or devices having small form factor.

In WO 2009/016614 a process for counting and measuring is described. The process includes capturing of a background image not including any objects to be counted. Then an image is taken when objects are placed in front of the camera. The areas differing from the background image are interpreted as objects and the number of objects may be calculated by multiplying the area of the interpreted objects by a factor or by using a lookup table including values connecting an area to a value indicating the number of objects. This method is simple and effective when it comes to counting stationary objects. However, when moving objects passing a boundary are to be counted, this method is not reliable.

SUMMARY OF THE INVENTION

The present invention relates to an improved object counter.

In particular, according to a first aspect of the present invention, a method comprises capturing images representing moving images of a predetermined counting view, detecting a motion region in the moving images of the predetermined counting view, calculating an motion region speed value indicating a speed of movement of the motion region, repeatedly defining a contribution zone based on a predetermined counting boundary, the motion region speed value, and a contribution time period dt, repeatedly retrieving and registering a sub area value representing the size of the area of the motion region contained in the defined contribution zone, generating a total area value by adding a plurality of registered sub area values, and estimating the number of objects that have passed the counting boundary by dividing the total area value by an reference object area value, wherein said contribution time period corresponds to the time period between two consecutive acts of retrieving a sub area value.

This method facilitates counting moving objects in a processing environment having limited capacity, e.g., processing capacity, storing capacity, etc. One reason for this results from the fact that the method operates on area flow, i.e., sub areas within a motion region, and therefore there is no need for processing intensive operations such as object tracking.

In one embodiment, the method is performed in a camera that is enabled to capture moving images. Thereby the bandwidth requirement of the system may be decreased, because no images are required to be sent over the network for the people counter functionality.

In another embodiment, a contribution zone is defined repeatedly as long as an object is detected in the moving images.

According to yet another embodiment, the act of estimating a count of objects that have passed the counting boundary is performed when no motion regions are present in their respective contribution zone. By performing the estimation when no objects are present in their corresponding contribution zone, no processing relating to objects being present in their corresponding contribution zones is necessary. Hence, the system may operate using less processing capacity than if both operations where to be performed simultaneously.

According to another embodiment, the method further comprises the step of adding the estimated count to a variable representing the total count.

In one embodiment, the detecting of a motion region further comprises detecting a plurality of motion regions simultaneously present in the counting view. By detecting a plurality of motion regions, the accuracy of the subareas may be increased because individual characteristics, e.g., velocity, of each motion region may be considered when registering subareas of different motion regions. Moreover, the calculating of speed values may include calculating individual speed values for the detected motion regions respectively, and thus making it possible to define independent contribution zones for each of the motion regions. Thereby the accuracy of the subareas may be even further increased.

In yet another embodiment, the act of defining a contribution zone is performed between two consecutive acts of retrieving and registering a sub area value representing the size of the area of the motion region contained in the defined contribution zone.

In another embodiment, the act of defining a contribution zone is repeated before each act of retrieving and registering a sub area value.

According to another aspect of the invention, an object counter for counting objects passing a specified counting boundary comprises an image sensor arranged to capture images of a predetermined counting view, a motion region detector arranged to detect moving regions in the captured images and to calculate a speed value indicating a speed of movement of the motion region, a contribution zone calculator arranged to repeatedly define a contribution zone based on a predetermined counting boundary, the speed of movement of the motion region, and a contribution time period dt, an area calculator arranged to retrieve and register a sub area value representing the size of the area of the motion region contained in the defined contribution zone, an area accumulator arranged to accumulate a total area value by adding a plurality of registered sub area values, and an object counting unit arranged to calculate the number of objects that have passed the counting boundary by dividing the total area value by an reference object area value.

This object counter facilitates counting moving objects in a processing environment having limited capacity, e.g., processing capacity, storing capacity, etc. One reason for this results from the fact that the object counter includes a contribution zone calculator and an area calculator making the object counter operate on area flow, i.e., sub areas within a motion region, and therefore there is no need for processing intensive means such as identity critical object trackers.

In one embodiment, the object counter is arranged in a camera. Thereby the bandwidth requirement of the system may be decreased, because no images are required to be sent over the network for the people counter functionality.

In another embodiment, the motion region detector further is arranged to detect a plurality of motion regions simultaneously present in the counting view.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF EMBODIMENTS

Figure 1:
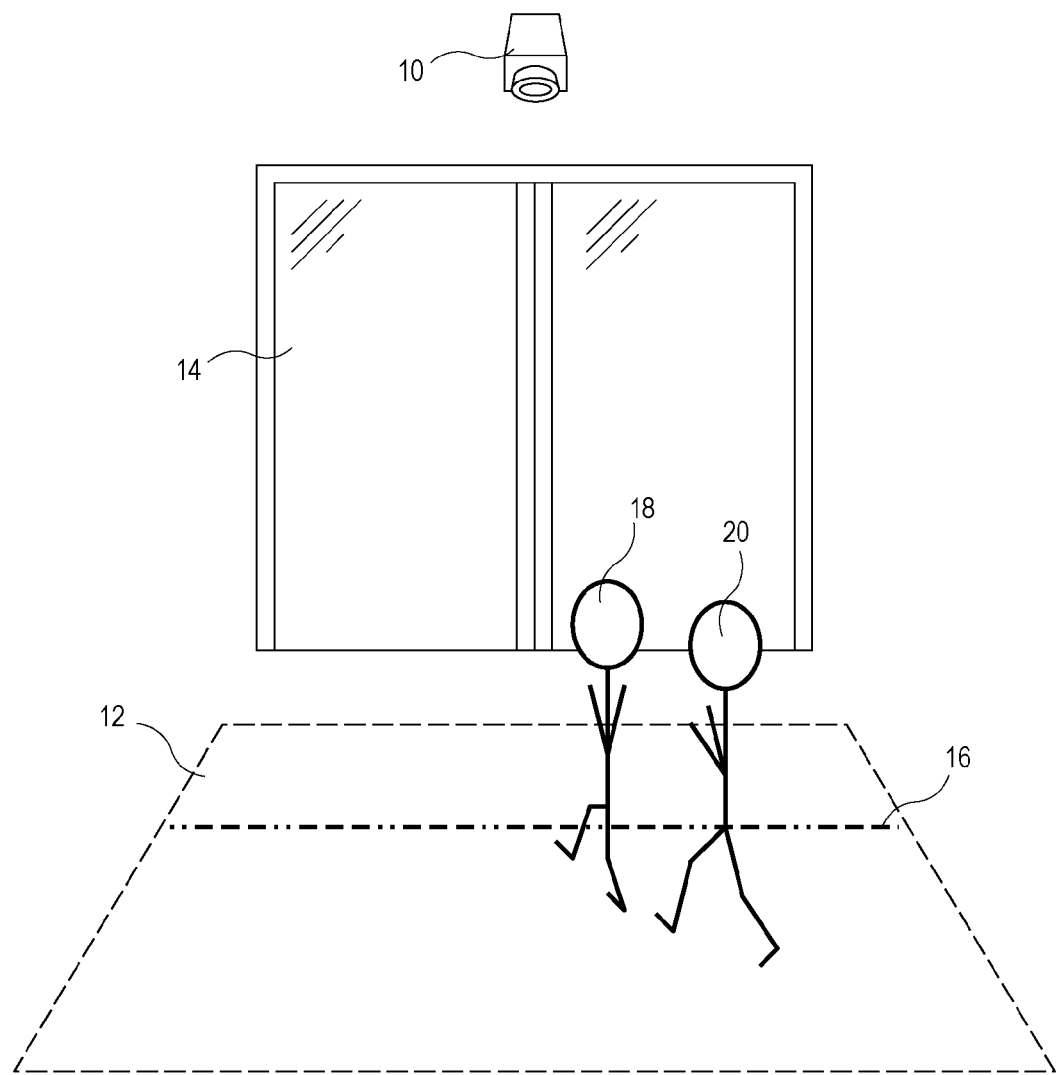
FIG. 1 is a schematic drawing of one possible environment in which the invention may be used.

Before the invention is described in detail, it is to be understood that this invention is not limited to the particular component parts of the device described or steps of the methods described, as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps. Moreover, in the figures like reference characters designate like or corresponding parts throughout the several figures.

The present invention is related to the task of counting objects. Methods for counting objects are in many cases well suited for counting a great variety of different objects, i.e., the general method are seldom customized for a particular object type. This also applies to the present invention. The method according to the present invention may advantageously be used to count substantially any type of moving objects crossing a counting boundary. The counting boundary may essentially be of any shape defining a boundary, e.g., a line, a plurality of lines having difference directions and being connected into one continuous boundary, an arc, a circle, etc.

One setup for an embodiment of the invention is depicted in FIG. 1. In this particular setup, a camera 10 is arranged having a counting image view 12 for capturing images of a passage where people 18, 20 to be counted are passing by. For instance, such a setup may be arranged at an exit 14 and/or entrance 14. Then a system including the camera 10 is arranged to count the number of people passing the counting boundary 16, which may be a boundary only defined in the counting system, i.e., not necessary a line visible at the exit/entrance. The passage, exit or entrance may belong to a shop, a supermarket, a department store, a park, a train station, a library, an amusement park, etc. The camera 10 may be arranged over the persons to be counted, e.g., mounted in the ceiling or high up on a wall in order to minimize the risk of a person 18 in the zone, i.e., in the counting image view 12, being obscured or hidden by another person 20. The setup of FIG. 1 may also be used in a system for counting cars entering and/or exiting a car park.

Figure 2:
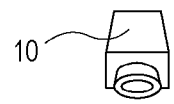
FIG. 2 is a schematic drawing of another possible environment in which the invention may be used.
Figure 2:
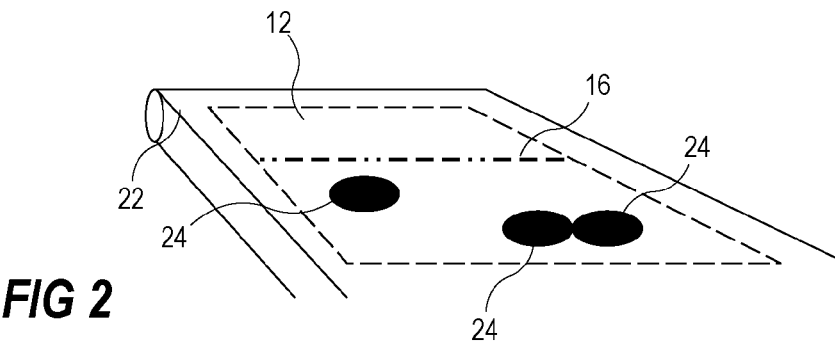

Another setup for an embodiment of the invention is depicted in FIG. 2. In this setup, the camera 10 is arranged having a counting image view 12 covering part of a conveyer belt 22 transporting objects 24. The counting system is arranged to count the number of objects passing the counting boundary 16. The objects counted in this way may be any objects, including persons and animals. This type of application may be arranged to count products on a production line, luggage in a luggage transport system, people in an escalator, etc.

Figure 3:
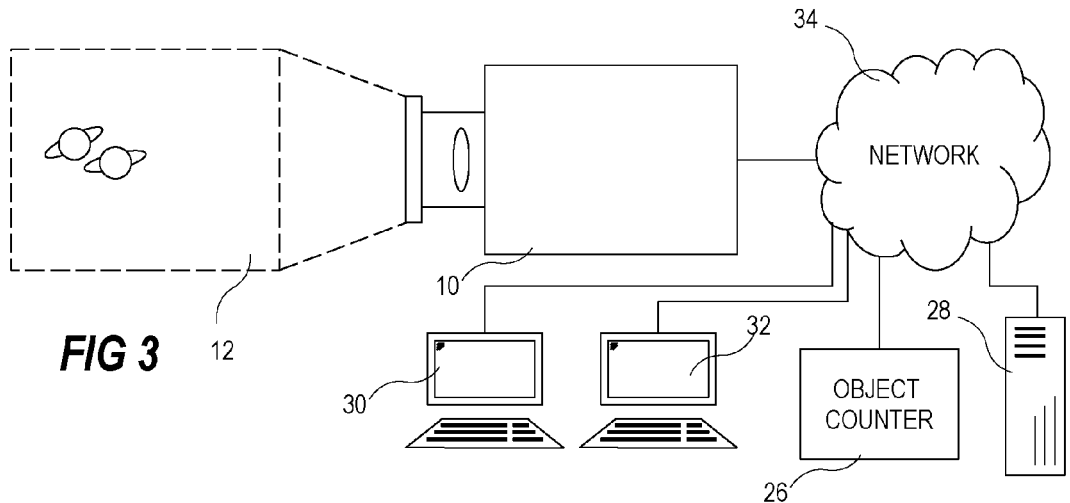
FIG. 3 is a schematic drawing of one setup of the present invention.
Figure 4:
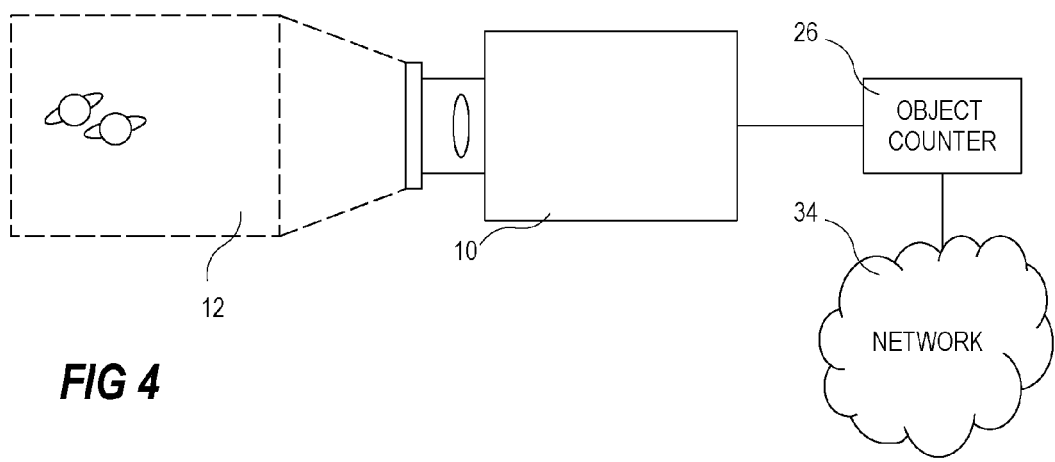
FIG. 4 is a schematic drawing of another setup of the present invention.
Figure 5:
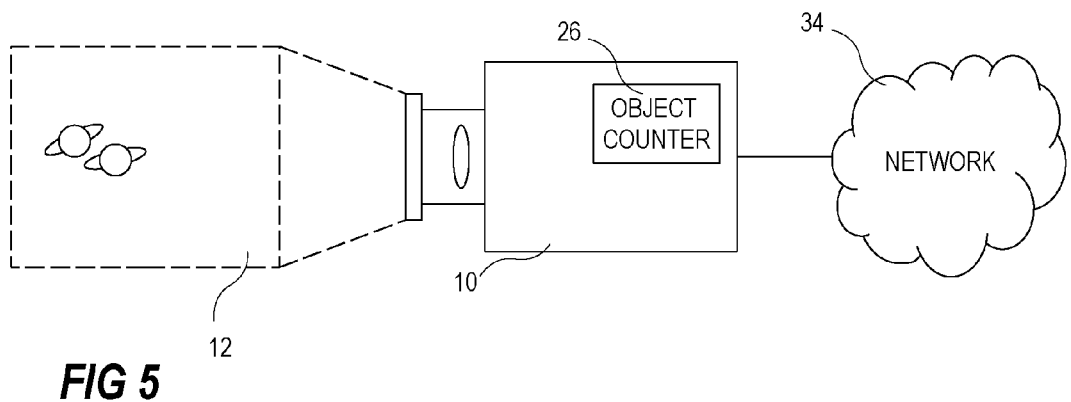
FIG. 5 is a schematic drawing of yet another setup of the present invention.

Now referring to FIGS. 3-5, the counting system of one embodiment is based on a camera 10 registering images of a counting image view 12 and an object counter 26 arranged to analyze the images captured by the camera 10 and to determine how many objects that have passed the counting boundary 16. As mentioned above, the counting boundary 16 may be defined as a virtual boundary in the object counter 26.

The object counter 26 may be a device external to the camera and may be a device dedicated for the task of counting objects based on received images, see FIG. 3. However, this functionality may as well be implemented in a server 28, a personal computer 30, a workstation 32 etc. The images for the object counter 26 may be transferred from the camera 10 via a computer network 34. The result may likewise be presented via the computer network 34.

According to another embodiment, the object counter 26 once more is a device external to the camera 10, see FIG. 4. The object counter 26 may be a dedicated device, but it may also be implemented in other devices as shown in connection with FIG. 3. In this embodiment, the object counter 26 receives the images directly from the camera 10 and may be arranged to present the result via a computer network 34.

According to yet another embodiment, see FIG. 5, the object counter 26 may be embedded in the camera 10. In this embodiment, the result from the counting may be presented via the computer network 34 as disclosed above. However, any of these embodiments may be arranged to present the resulting count via any type of communication. Some advantages of embedding the object counter 26 in the camera 10 are that the counting system requires less space, that the counting system may be more reliable as the images which the count is based on is internally transferred instead of relying on a network connection, that installation of the counting system is facilitated as only one device has to be installed and no communication path has to be set up, that the system requires much less bandwidth as, for example, data representing one single value is very small in relation to a colour image in which each pixel is represented by at least three values each, etc.

Figure 6:
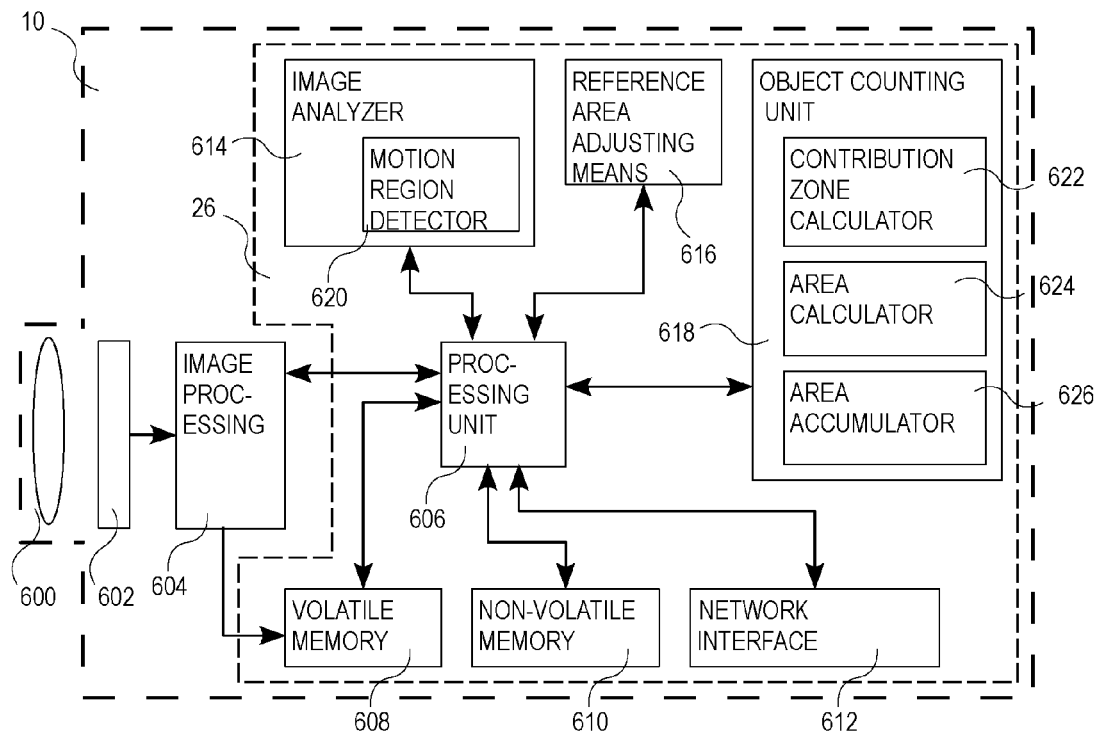
FIG. 6 is a block diagram showing functional blocks of a camera system according to one embodiment of the invention.

A camera 10 having the object counter 26 embedded is illustrated by the generalized block diagram in FIG. 6. This embodiment includes a lens 600, an image sensor 602, and an image processing unit 604, all arranged for image capturing. Moreover, the camera includes a processing unit 606, a volatile memory 608, a non volatile memory 610, and a network interface 612, all arranged for use in relation to general operation of the camera 10 and in relation to the image capturing functionality. These parts are well known to persons skilled in the art and their functionality does not need to differ from the normal functionality of such parts. Further, the camera 10 includes an image analyzer 614, a reference area adjusting means 616, and an object counting unit 618. Each of the image analyzer 614, the reference adjusting means 616 and the object counting unit 618 may be implemented by means of hardware, e.g., built from logic circuits, or they may be implemented by program code that is to be run by the processing unit 606 and stored in the memory 608, 610.

The image sensor 602 may be any sensor detecting some feature related to the objects e.g., an image sensor detecting the visible part of the light spectrum for detecting visible features of objects, or a Focal Plane Array, such as for example, a microbolometer sensor detecting in the infrared part of the light spectrum for registering the thermal profile of objects, or a time-of-flight sensor system creating an image of the distance to objects in an image view. The output from the image sensor 602 is data that may be represented as a two dimensional image and be interpreted and analyzed by means of image analyzing tools.

The image analyzer is arranged to analyze image data captured by the image sensor 602 and may include a detector of motion regions 620. The detector of motion regions 620 is arranged to detect motion regions in the images captured by the image sensor 602 and perform functions related to the detection of motion regions as described below, e.g., detecting and segmenting motion regions, estimating velocity of the detected motion region, etc. In the present application a motion region is to be understood as a region 10 of image elements, e.g., pixels, in the image wherein the entire region is moving in substantially the same direction and which motion region is only temporarily stopping such movement.

The reference area adjusting means 616 is arranged to adjust a norm value $A_{no}$ indicating a normal size for an object to be counted. How to perform the adjustment of this value is further described below. However, the camera 10 does not necessary include this area adjusting means 616, but may rather include a preset fixed value indicating a normal area value $A_{no}$. The $A_{no}$ value may be stored in either volatile 608 or non-volatile 610 memory.

The object counting unit 618 is arranged to generate a value corresponding to the number of objects that have crossed a counting boundary 16 of the counting image view 12. It may be arranged to do so by accumulating the area of motion regions that have passed the counting boundary and dividing this accumulated area by said normal area value $A_{no}$. According to one embodiment, the accumulation of the area of motion regions may be accomplished by studying the area flow crossing the counting boundary. In order to enable this area accumulating functionality, the object counting unit 618 further includes a contribution zone calculator 622 arranged to determine a contribution zone for each discrete image including a motion region possibly representing an object to be counted, an area calculator 624 arranged to calculate the momentary area flow corresponding to the area present in the contribution zone, and an area accumulator 626 arranged to calculate the integral area of the momentary area flow or add the discrete area values for each sample period and accumulate a total area value to be used in counting. Further details relating to the functionality of the object counter will be described below.

According to another embodiment, the object counting unit 618 is arranged in a separate device connecting to a camera 10 via a computer network 34. According to yet another embodiment, the image analyzer 614, the reference adjusting means 616 and the object counting unit 618 all may be arranged in a separate device receiving image information to process via a network 34.

Figure 7:
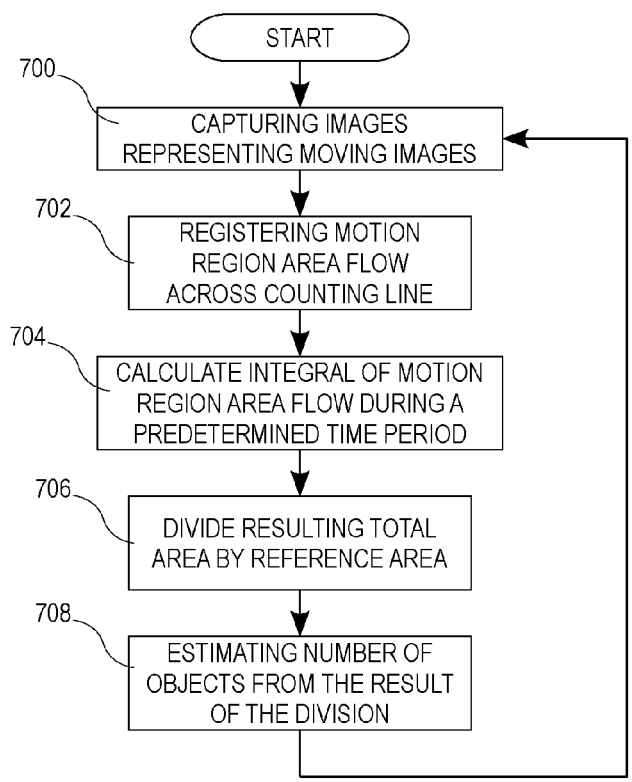
FIG. 7 is a general flowchart of a method according to one embodiment of the invention.

Hence, a method for counting objects may be implemented by means of circuit logic or by means of a program code running in a processing unit 606. According to one embodiment of the invention, see FIG. 7, the method for counting includes the step of capturing images representing moving images, step 700, registering from the captured images motion region area flow across a defined counting boundary, step 702, and calculating the integral of the registered motion region area flow during a predetermined time period, step 704. Calculating the integral may include summing area slices of the motion regions. Thereby a total area relating to a likely object or likely objects that has/have crossed the counting boundary is obtained without requiring the system to identify and keep track of individual objects during its presence in the image view.

Then the resulting total area is divided by a reference area, step 706, and the result from the division is used for estimating the number of objects that have crossed the counting boundary, step 708. After the number of objects has been estimated in step 708 a new area acquiring cycle is started.

The predetermined time period may be of any length that is suitable for a particular application. In another embodiment, the predetermined time period may be replaced by a time period determined by features registered by the camera, e.g., accumulate area until no area flow is registered. This may be implemented by integrating motion region area slices as long as there are possible objects crossing the boundary and then perform the estimation. In yet another embodiment, the area is accumulated continuously without a reset and then presenting the number of objects passed by upon request from a user or another system.

According to one particular embodiment, the steps of dividing the resulting total area by a reference area, step 706, and the estimation of the number of objects, step 708, are to be performed as soon as possible in order to avoid accumulation of errors relating to a reference area not corresponding exactly to the area of the objects counted. This is particularly evident when counting objects of varying sizes, e.g., people, animals, etc. Accordingly, if a total area of 1.2 times the reference area is registered, then it is very likely that one object has passed and that this particular object was somewhat larger than the area of the reference object. However, if a total area of 4.8 times the reference area is registered then the system may estimate the number of objects that have passed to five. This estimate may be correct, but if four objects have passed, each having an area of 1.2 times the reference area, the counter will still indicate that five persons have passed. Hence, this accumulated error may be avoided or at least kept to a low level if the number of objects is estimated as soon as possible.

The process may also upon request allow output of an area value indicating the presently accumulated total area even if the process has not reached a state in which it automatically outputs the area and estimates the number of objects, i.e., an output of an area value may be requested at any time.

In one particular embodiment, the above method is implemented as described below in connection with the process of FIG. 8. The description below relating to FIG. 8 also refers to FIGS. 10-12. Initially the process is arranged to capture images from the counting image view and detect the presence of motion regions in these image views, step 802.

Figure 10:
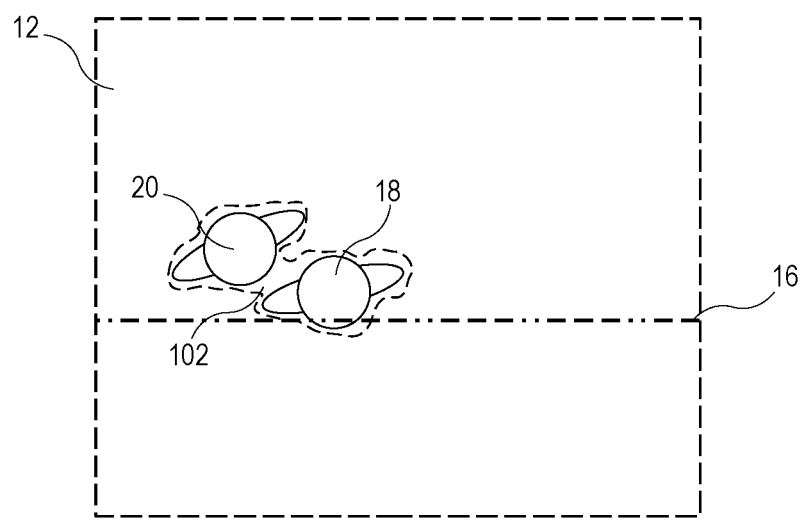
FIG. 10 is a schematic image of an image view analysed by means of the invention.

In FIG. 10, representing a counting image view captured by the camera 10, two persons 18, 20 are captured in the counting image view 12 and the step of detecting motion regions 802 has resulted in the detection of one motion region 102, indicated by the dashed line. In this example, the detection of motion regions, step 802, resulted in one detected motion region 102 despite the fact that there are two persons 18, 20 in the counting image view 12. As previously mentioned, the reason for this is that motion region detecting algorithms are not able to distinguish objects close to each other and therefore, the motion region 102 is detected as one motion region 102 covering both the persons 18, 20.

Figure 11:
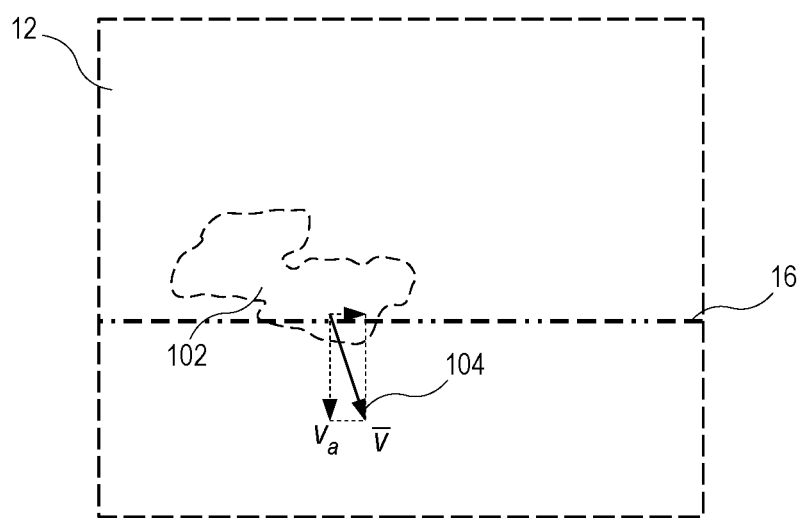
FIG. 11 depicts values and data retrieved from the image view in FIG. 10, FIGS. 12-14 graphically show the effect of alternative embodiments of a function defining a contribution zone.

Then a velocity vector/vectors $\bar{v}$ 104 describing the movement of the detected motion regions 102, step 804, are generated. As the motion region 102 in FIGS. 10 and 11 is detected as one motion region there is only one velocity vector $\bar{v}$ 104 depicted in FIG. 11. Said generated velocity vector/vectors $\bar{v}$ 104 include the direction and the speed of the movement relating to each detected motion region 102.

Then a boundary of a contribution zone is calculated, step 806, for each detected motion region 102 based on the velocity of the corresponding motion region 102 and the time period between two consecutive steps of generating a sub area value to be added to an accumulated total area.

Figure 12:
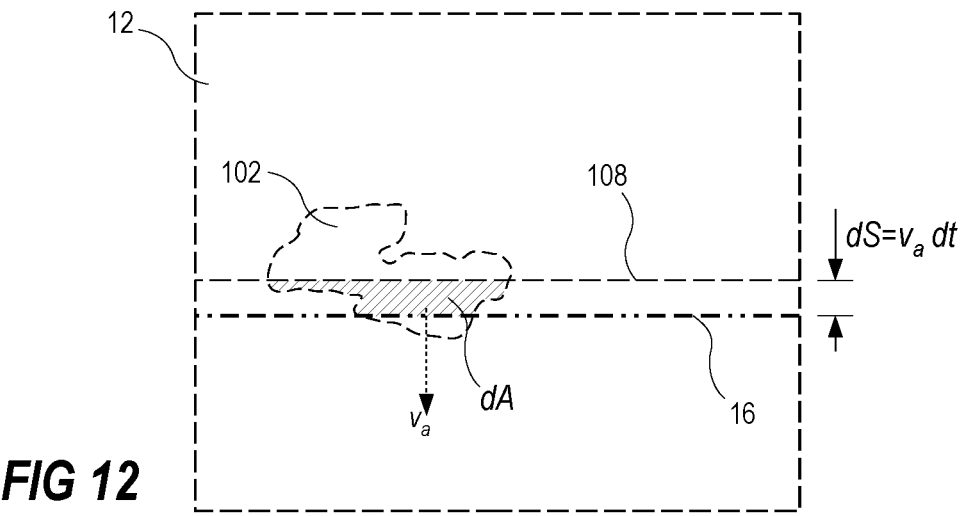

According to one embodiment, exemplified in FIG. 12, the contribution zone is defined by the counting boundary 16, which in this particular embodiment is a line, the width of the entire counting image view 12 and a contribution line 108 being a line parallel to the counting boundary line 16 and arranged at a distance dS from the counting boundary line 16. The distance dS corresponds to the distance that the motion region 102 travel towards the counting boundary line 16 during a time period dt corresponding to the time between consecutive steps of generating a sub area value to be added to an accumulated total area. The distance dS may for example be calculated as $dS = v_a \, dt$.

Accordingly the distance dS may be acquired by multiplying the velocity $v_a$ with a small time value dt, e.g., the time between two consecutive sub area determinations, between two consecutive image captures, etc. In this equation, the variable $v_a$ is the velocity component of the velocity vector $\bar{v}$ 104 and has a direction perpendicular to the counting boundary line 16, see FIG. 11. The time variable dt may be the time between two consecutive steps of generating a sub area value to be added to an accumulated total area or similar cycles, e.g., time between consecutive contribution zone calculations, consecutive checks of whether a motion region is in proximity of counting boundary, consecutive motion region detections, etc. However, the time variable dt may also be set to the time between a plurality of cycles or to a fixed value not relating to any particular feature of the process. Accordingly the distance dS may be acquired by multiplying the velocity $v_a$ with a small time value dt.

Then, if any motion region 102 detected is found to be in proximity of the counting boundary line 16, (i.e., for this particular embodiment, found to be present in the contribution zone relating to itself, step 808), then the process continues by generating a sub area dA for each motion region 102 being present in the contribution zone relating to themselves, step 810.

Hence, the sub area dA may be described as dA=|contribution zone∩motion region|. The intersection of the contribution zone and the motion region 102 may be determined by means of polygon clipping or an AND operation on a pixel level between the contribution zone and the detected motion region 102. Then, the sub area dA may be calculated as the area of the resulting polygon or the sum of the resulting pixels. The skilled person will recognize further methods for determining the sub area dA. Accordingly, each sub area dA indicates the area of the motion region 102 being present in the corresponding contribution zone. The sub area dA may also be seen as an area flow value.

When each sub area dA is determined, each sub area dA is added to a total area $A_{tot}$, step 812, in order to accumulate the area corresponding to the objects passing the object detection boundary 16. These steps of detecting motion region 802, generating velocity vector 804, calculating boundary 16 of contribution zone 806, checking if motion region 102 is in proximity of counting boundary 808, generating sub area dA 810, and adding the contribution area dA to the total area $A_{tot}$, is repeated until a timer ti expires, step 814. After the timer ti has expired, the number of objects that have passed during the time period ti is determined by dividing the accumulated total area $A_{tot}$ by a value representing the area of a reference object $A_{no}$, step 816. Thereby the number of objects may be approximated as $N_{obj} = A_{tot}/A_{no}$. This estimated number of objects may be accumulated for providing a value representing a longer time period or it may be stored for future access by an interested party. When the number of objects that has passed the counting boundary has been estimated, the variable representing the total area $A_{tot}$ is reset, step 818, e.g., set to zero, and the process returns to the step of detecting objects, 802, and further objects may be counted.

Figure 8:
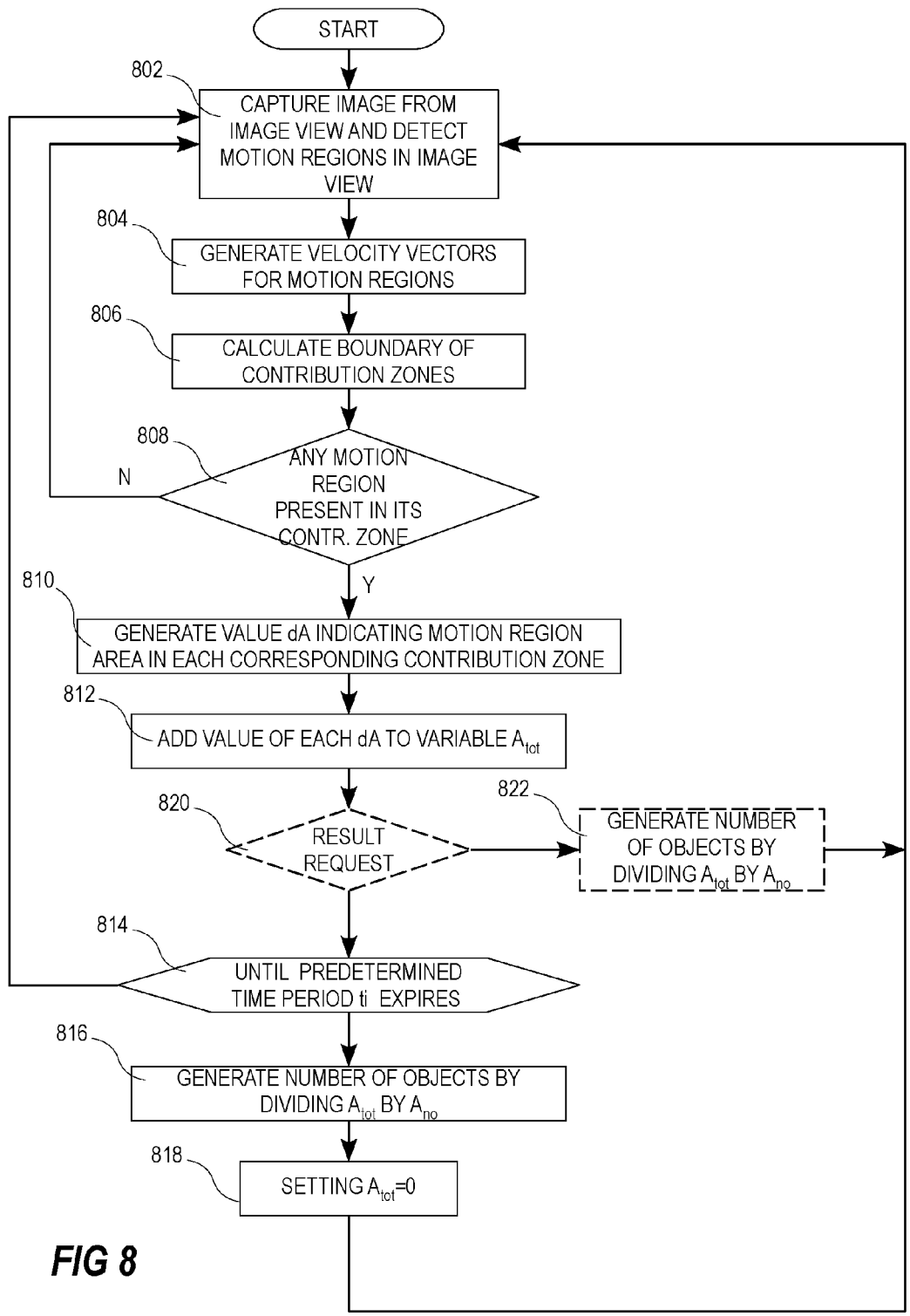
FIG. 8 is a flowchart depicting one embodiment of the invention.

According to another embodiment, which is represented in FIG. 8 by the additional processing steps drawn using dashed lines, steps 820 and 822, the process may be enabled to detect a result request, step 820, from a user or from an interacting system. In response to the request 820, the process proceeds and performs the calculation of dividing the accumulated total area $A_{tot}$ by the value representing the area of a reference object $A_{no}$, step 822. The process continues accumulating subareas by returning to step 802. In this particular embodiment the ti time period may be set to a large value in order to reset the accumulated total area $A_{tot}$ very seldom. The system may even be set to never reset the accumulated total area $A_{tot}$ until the camera is restarted or reset.

In one embodiment the detection of regions, step 802, and the generation of velocity vectors $\bar{v}$, step 804, is performed by the existing functions of the camera 10 and then inputted to the object counting process. This input to the object counting process may be one or a plurality of motion region indicators, e.g., a bit mapping of each motion region 102, or any one of a polygon, an ellipse, a rectangle, a circle etc. approximating each motion region 102. Further, the object counting process may receive a velocity vector $\bar{v}$ associated to each motion region 102 or a motion field. A motion field may include the velocities for substantially all visible surface points or pixels of the image. In the case of the input to the object counting process being a motion field, the motion field may be combined with the representation of the motion regions 102 in order to generate a velocity vector $\bar{v}$. How to perform such combination is well known to the person skilled in the art. These processing steps may of course be performed by software in the processing unit 606 as well.

In order to detect motion regions, a plurality of possible methods may be used. Some examples of possible algorithms to use in order to recognize motion regions may be a segmentation algorithm such as the one presented by Stauffer and Grimson in "Adaptive background mixture models for real-time tracking" published in "1999 IEEE Computer Society Conference on Computer Vision and Pattern Recognition (CVPR'99)-Volume 2", June 1999, pp. 2246, an algorithm like the one presented in the European Patent application no. 2 172 903, by Almbladh, an algorithm in accordance with optical flow theory as discussed by S. S. Beauchemin, J. L. Barron in "The computation of optical flow", 1995, ACM New York, USA., or any other segmentation algorithm known to the skilled person.

Moreover, a plurality of methods for generating data relating to the velocity of detected motion regions are well known to the person skilled in the art. One example of such method is to generate a motion field as discussed in the optical flow theory and from this motion field obtain a velocity vector $\bar{v}$. Another example is to compare the motion regions from consecutively captured image frames, assume that a motion region of the second image frame having areas in common with a motion region of the first image frame represents the same motion region, and thereby calculate the velocity vector based on the time between the two consecutive frames and the distance of movement of the motion region. Yet another method includes the use of a simple "blob tracker" arranged to keep track of a motion region long enough for estimating the velocity, but not long enough for guaranteeing the identity of the blob during the entire time period when the motion region is present in the counting view. Further methods for generating the velocity vector $\bar{v}$ are well known to the person skilled in the art and, thus, the examples above are not to limit the scope of protection of the present invention.

Figure 9:
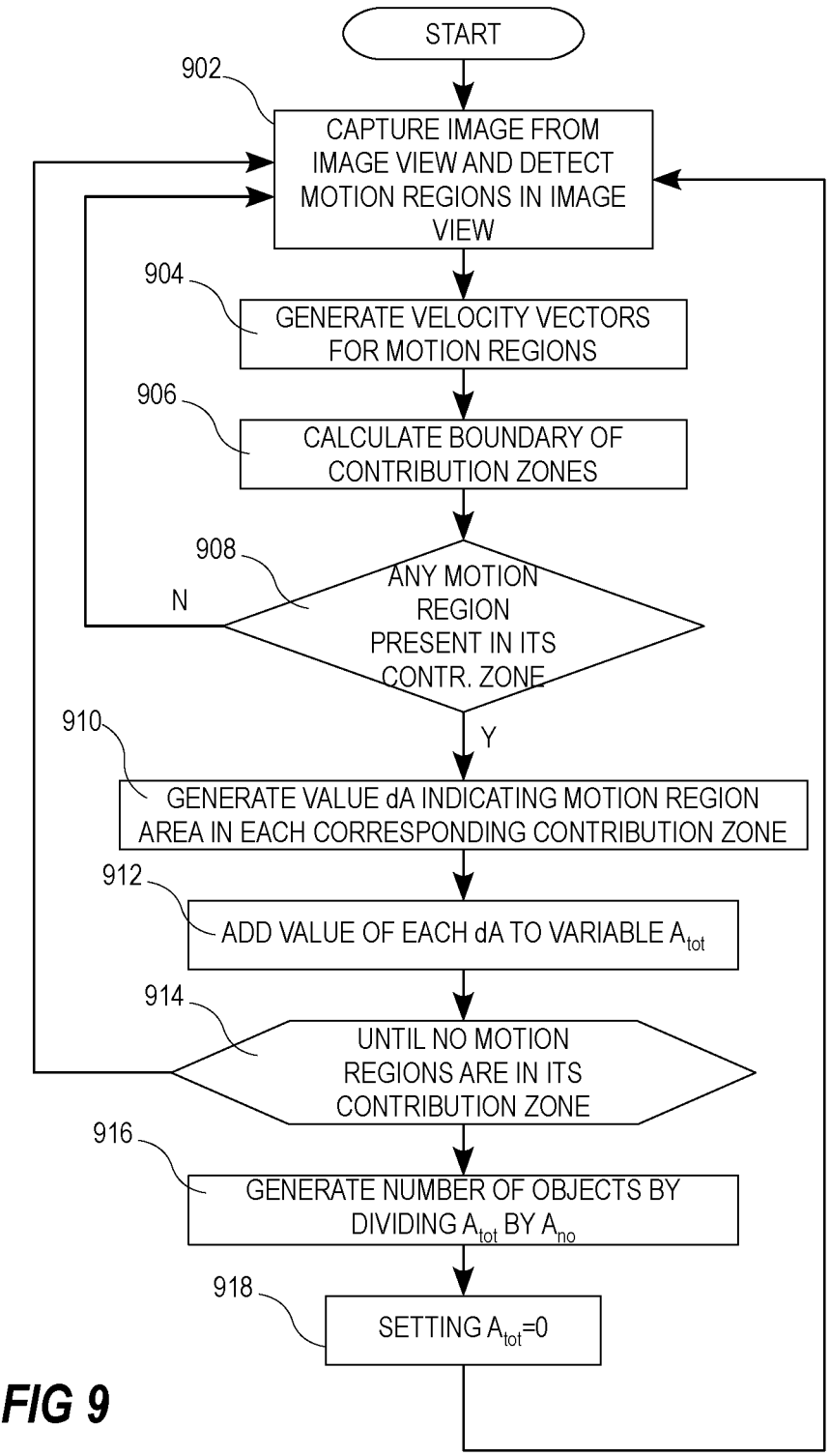
FIG. 9 is a flowchart depicting another embodiment of the invention.

Another embodiment is depicted in FIG. 9. This process is very similar to the process described in FIG. 8; therefore, the steps 902-912 and 916-918 are identical to the steps 802-812 and 816-818. However, step 914 differs from 814 in that the accumulation of area values in $A_{tot}$ continues until no motion regions are in proximity to the counting boundary 16. Hence, the number of motion regions that has passed the counting boundary 16 is estimated during a period when no motion regions are passing the counting boundary. Depending on the implementation of the motion region detector, the result of the counter may be made more reliable if an indicator of a motion region being halted is included.

In another embodiment, not shown, a step corresponding to 814 or 914 may be arranged to combine these two approaches. Accordingly, the accumulation of area values in $A_{tot}$ continues until no motion regions are in proximity to the counting boundary 16 unless a time period ti has expired, generating the value indicating the number of objects by dividing $A_{tot}$ by $A_{no}$ if any of these conditions is fulfilled.

In FIGS. 8-9, the velocity vector $\bar{v}$ is generated for each detected motion 102. This may be performed as part of the motion region detection or as a separate process. In another embodiment, the velocity vector $\bar{v}$ is not generated for a motion region 102 until the motion region 102 touches or is at a predetermined distance from the counting boundary 16. This embodiment may be advantageous if the implementation cannot afford to process every detected motion region for a velocity vector $\bar{v}$.

The reference area $A_{no}$, which is used in order to calculate the number of objects passing the counting boundary, may be estimated by comparing the accumulated area $A_{tot}$ to a known number of objects that have crossed the counting boundary, or it can be inferred statistically by analyzing and estimating the quantization step in a number of measured total areas from a large but unknown number of objects that have crossed the counting boundary. Using this "self-learning" method for estimating the reference area, the object counting system could improve the accuracy in the reference area with time. An advantage with object counting system is that it does not require any, or at least only some, manual calibration or configuration. The reference area, $A_{no}$, could for example be an average or the median value of the area of all customers detected by the people counter. It could alternatively be a predetermined, fixed, number.

Figure 13:
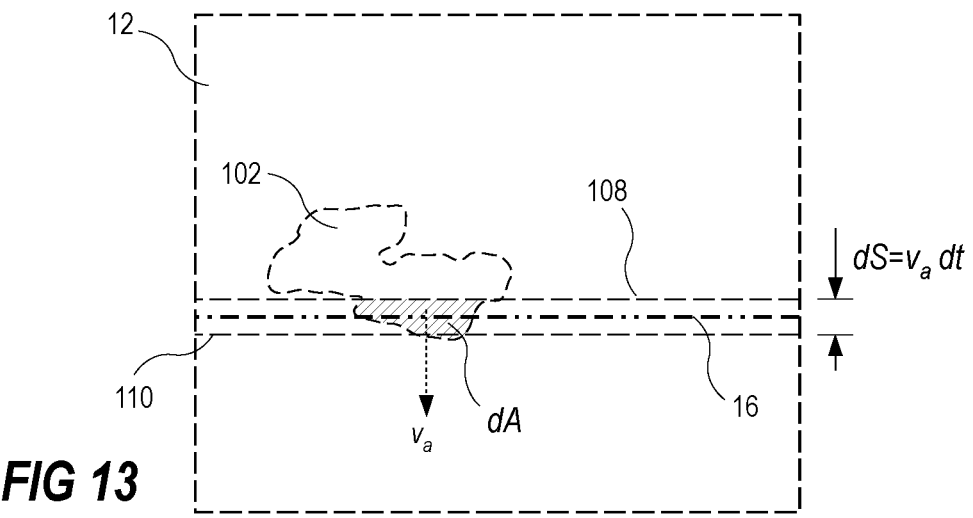

One way of setting up the boundary of the contribution zone was described in connection with FIG. 8 and FIG. 12. Another way of setting the contribution zone is depicted in FIG. 13. This method also includes calculating the distance dS that the motion region 102 travel towards the counting boundary line 16 during a time period dt between consecutive calculations of the contribution zone. However, the distance dS is used for setting two parallel contribution lines 108, 110 which are arranged on different sides of the counting boundary 16. Thereby the contribution zone is defined by the two parallel contribution lines 108, 110 and the width of the entire counting image view, i.e., the edges of the counting image view being perpendicular to the contribution lines 108, 110. The contribution lines 108, 110 may be arranged at different distances from the counting boundary or at the same distance.

Figure 14:
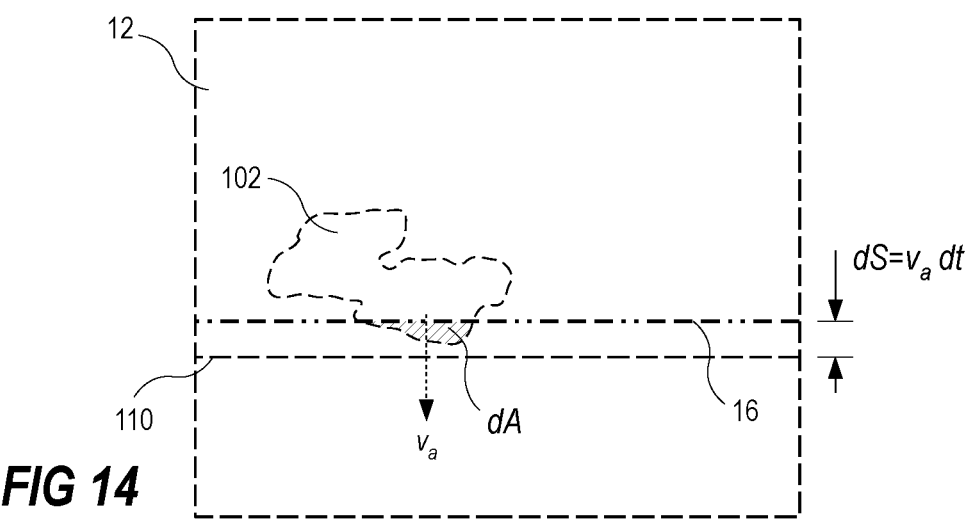

Yet another way of setting the contribution zone is depicted in FIG. 14. Once again the distance dS is calculated. However, this time a contribution line 110 is arranged on the far side, in respect of the travel direction of the motion region 102, of the counting boundary 16 at a distance dS from the counting boundary 16. Thereby the contribution zone is defined by the counting boundary 16, the contribution line 110 and the width of the entire counting image view.

In order to facilitate the understanding of the invention, the processing in one specific embodiment of the invention is applied to a scenario of two persons crossing the counting boundary 16. The processing of this scenario will be described below referring to FIGS. 15a-f and 16. The FIGS. 15a-f illustrate an image sequence of six images acquired from time to $t_0$ time $t_5$.

Figure 15A:
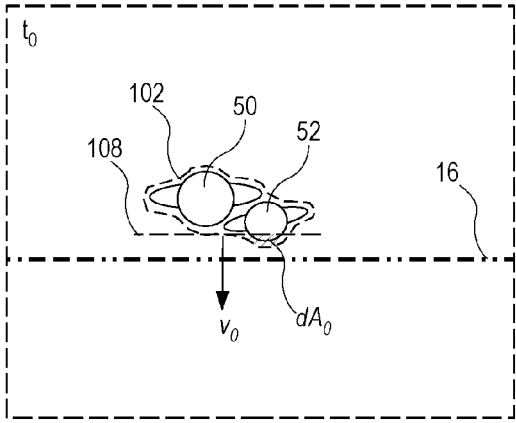
FIGS. 15a-f is a series of image views representing consecutive images being processed in accordance with an embodiment of the invention.
Figure 16:
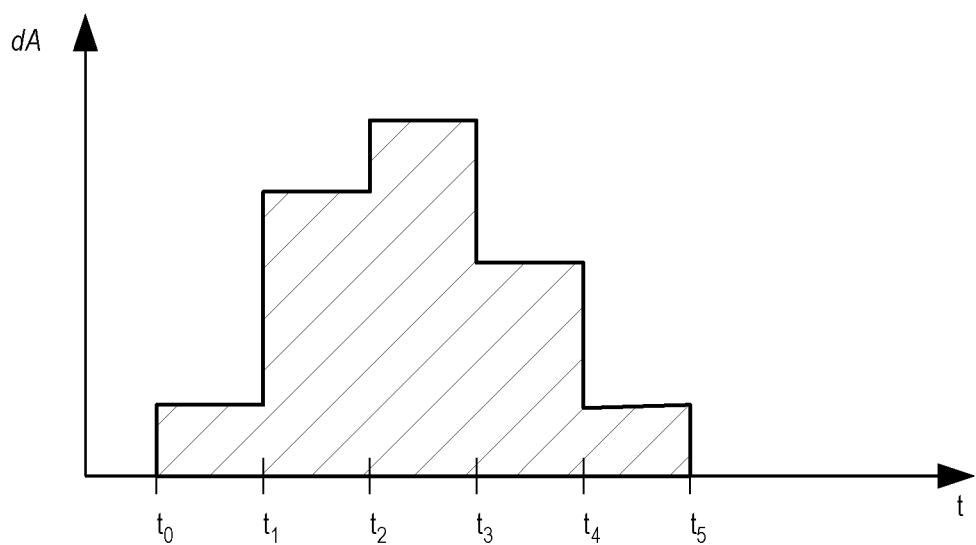
FIG. 16 shows a graph representing individual contributing areas and the total area.

In FIG. 15a, at time to, the two persons 50, 52 are detected as one motion region 102, indicated by dashed lines, since they are walking closely together. The detected motion region 102 has reached the contribution line 108, and the velocity component vo indicates that it will reach the counting boundary 16 within the following time slice dt. Therefore, the motion region 102 is within the contribution zone, and the momentary area flow, $dA_0$, also called sub area in the previous description, is therefore non-zero, as depicted in the graph of FIG. 16.

Figure 15B:
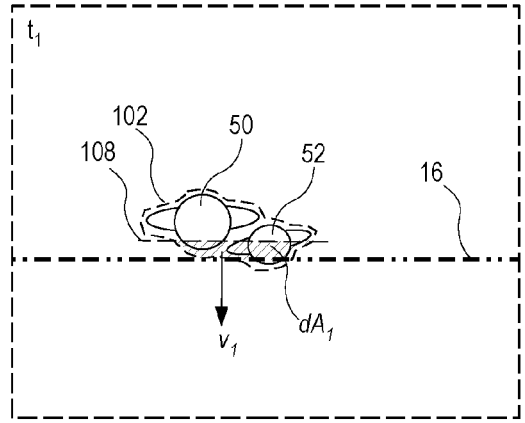

Now referring to FIG. 15b representing the next frame at time $t_1$, the two persons 50, 52, are still detected as one motion region 102. The contribution zone is calculated based on the velocity $v_1$. A part of the motion region 102 is now crossing the counting boundary 16 and a new momentary area flow, $dA_1$, is generated from the contribution zone as previously described. The area $dA_1$ of the motion region 102 being present in the contribution zone is greater at $t_1$ than at $t_0$, as seen in both FIGS. 15b and 16.

Figure 15C:
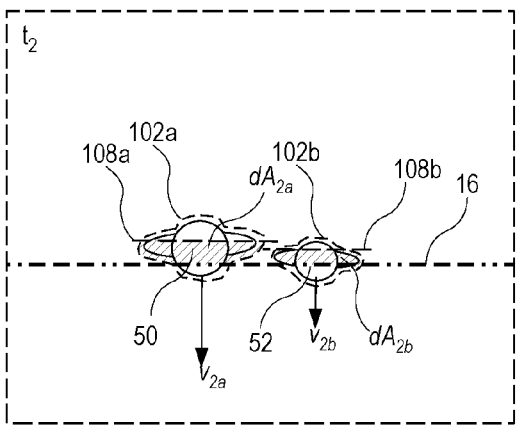

In FIG. 15c, representing an image captured at time $t_2$, the two persons 50, 52, have been walking away from each other and are therefore walking further apart. The two persons 50, 52 are hence detected as two separate motion regions 102a, 102b, and are generating two separate momentary area flow components, $dA_{2a}$ and $dA_{2b}$. The different area flow components $dA_{2a}$, $dA_{2b}$ are each calculated using the individual speed of each motion region $102_a$, $102_b$, (i.e., each motion region $102_a$, $102_b$ is provided with a contribution zone of its own based on the individual speed $v_{2a}$, $v_{2b}$ of each motion region 102a, 102b). In this example, $v_{2a} > v_{2b}$ and therefore a larger contribution zone is generated for the motion region 102a moving with the velocity $v_{2a}$ than for the motion region 102b travelling with velocity $v_{2b}$. According to one embodiment, the two momentary area flow components $dA_{2a}$ and $dA_{2b}$ are added together in order to generate the total momentary area flow $dA_2$ for the time slot $t_2$. According to another embodiment, the two momentary area flow components $dA_{2a}$ and $dA_{2b}$ are either stored separately or separately added to an accumulating variable indicating the total Area flow $A_{tot}$ that has crossed the counting boundary 16.

Figure 15D:
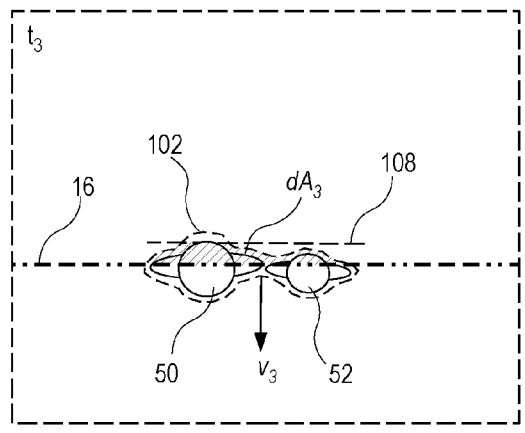

At time $t_3$, see FIG. 15d, the two persons 50, 52 once more are closer together, thereby generating a single motion region 102 covering the two persons 50, 52. Hence, a single momentary area flow component, $dA_3$, is generated.

Figure 15E:
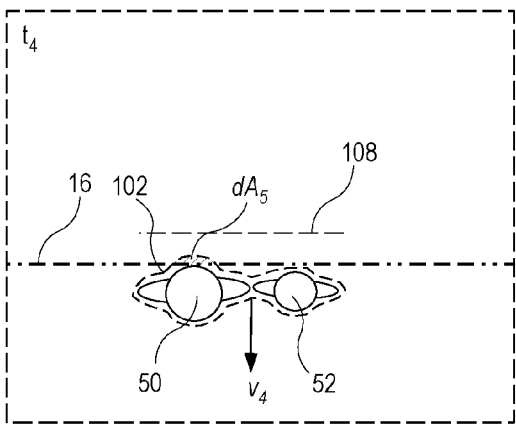
Figure 15F:
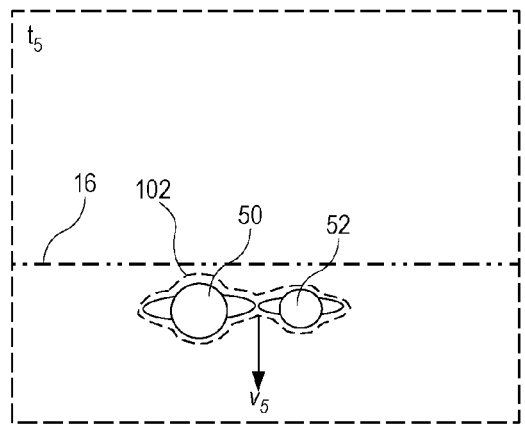

In the image captured at time $t_4$, see FIG. 15e, the final momentary area flow component, $dA_4$, for the motion region relating to the two persons 50, 52 is determined. Then, at time $t_5$, the two persons 50, 52, have completely passed the counting boundary 16 and no further area flow component may be determined.

As discussed above, the graph of FIG. 16 shows a graph representing the momentary area flow, or sub area, determined from the image sequence of FIGS. 15a-f. The area below the graph may be considered the accumulated area from the image sequence and would correspond to the integrated momentary area flow from $t_0$ to $t_5$, i.e., the total area $A_{tot}$.

In FIG. 15a it is further shown that a portion of an area of a motion region 102 may be registered even if no part of the detected motion region 102 touches the counting boundary 16. The motion region 102 only needs to be within its own contribution zone for the area flow contributions to be computable and the size of the contribution zone is, as previously discussed, dependent on the speed of the motion region 102. Hence a high-speed object will result in a larger contribution zone. In order to properly compute the area flow it is advantageous to have the entire contribution zone fully contained within the field-of-view of the object counter camera. This may be seen as an upper speed limit for objects being counted.

The invention claimed is:

1. Method for counting objects, the method comprising:
   capturing images representing moving images of a predetermined counting view;
   detecting a motion region in the moving images of the predetermined counting view;
   calculating a motion region speed value indicating a speed of movement of the motion region;
   repeatedly defining a contribution zone based on a predetermined counting boundary, the motion region speed value, and a contribution time period;
   repeatedly retrieving and registering a sub area value representing an area size of the motion region contained in the defined contribution zone;
   generating a total area value by adding a plurality of registered sub area values; and
   estimating the number of objects that have passed the counting boundary by dividing the total area value by an reference object area value;
   wherein the contribution time period corresponds to a time period between two consecutive acts of retrieving a sub area value.

2. Method according to claim 1, wherein said method is performed in a camera enabled to capture moving images.

3. Method according to claim 1, wherein the act of defining a contribution zone is performed repeatedly as long as the motion region is detected in the moving images.

4. Method according to claim 1, wherein the act of estimating a count of objects that have passed the counting boundary is performed when no motion regions are present in their respective contribution zone.

5. Method according to claim 4, further comprising the step of adding the estimated count to a variable representing the total count.

6. Method according to claim 1, wherein the detecting of a motion region further comprises detecting a plurality of motion regions simultaneously present in the counting view.

7. Method according to claim 6, wherein the detecting a plurality of motion regions includes calculating individual speed values for the detected motion regions respectively.

8. Method according to claim 1, wherein the act of defining a contribution zone is performed between two consecutive acts of retrieving and registering a sub area value representing the size of the area of the motion region contained in the defined contribution zone.

9. Method according to claim 8, wherein the act of defining a contribution zone is repeated before each act of retrieving a sub area value.

10. Object counter device for counting objects passing a specified counting boundary, the object counter device comprising:
- an image sensor arranged to capture images of a predetermined counting view;
- a motion region detector arranged to detect moving regions in the captured images and to calculate a speed value indicating a speed of movement of the motion region;
- a contribution zone calculator unit arranged to repeatedly define a contribution zone based on a predetermined counting boundary, the speed value, and a contribution time period;
- an area calculator unit arranged to retrieve and register a sub area value representing an area size of the motion region contained in the defined contribution zone; and
- an area accumulator unit arranged to accumulate a total area value by adding a plurality of registered sub area values, and an object counting unit arranged to calculate the number of objects that have passed the counting boundary by dividing the total area value by a reference object area value ($A_{no}$).

11. Object counter according to claim 10, wherein the object counter is arranged in a camera.

12. Object counter according to claim 10, wherein the motion region detector is further arranged to detect a plurality of motion regions simultaneously present in the counting view.

13. Object counter according to claim 10, wherein the contribution zone calculator unit, area calculator unit, and the area accumulator unit are implemented as logic circuits.

14. Object counter device for counting objects passing a specified counting boundary, the object counter device comprising:
- an image sensor arranged to capture images of a predetermined counting view;
- a motion region detector arranged to detect moving regions in the captured images and to calculate a speed value indicating a speed of movement of the motion region; and
- a processing unit configured to execute program code modules stored in a memory, the modules comprising:
  - a contribution zone calculator configured to repeatedly define a contribution zone based on a predetermined counting boundary, the speed value, and a contribution time period;
  - an area calculator unit configured to retrieve and register a sub area value representing an area size of the motion region contained in the defined contribution zone; and
  - an area accumulator unit configured to accumulate a total area value by adding a plurality of registered sub area values, and an object counting unit arranged to calculate the number of objects that have passed the counting boundary by dividing the total area value by a reference object area value ($A_{no}$).

15. Object counter according to claim 14, wherein the object counter is arranged in a camera.

16. Object counter according to claim 14, wherein the motion region detector is further arranged to detect a plurality of motion regions simultaneously present in the counting view.

* * * * *